US011144359B1

(12) United States Patent
Brooker et al.

(10) Patent No.: US 11,144,359 B1
(45) Date of Patent: Oct. 12, 2021

(54) MANAGING SANDBOX REUSE IN AN ON-DEMAND CODE EXECUTION SYSTEM

(71) Applicant: Amazon Technologies, Inc., Seattle, WA (US)

(72) Inventors: Marc John Brooker, Seattle, WA (US); Dylan Owen Marriner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 265 days.

(21) Appl. No.: 16/447,725

(22) Filed: Jun. 20, 2019

(51) Int. Cl.
  *G06F 9/50* (2006.01)
  *G06F 9/455* (2018.01)

(52) U.S. Cl.
  CPC .......... *G06F 9/505* (2013.01); *G06F 9/45558* (2013.01); *G06F 9/5055* (2013.01); *G06F 2009/45595* (2013.01)

(58) Field of Classification Search
  CPC .... G06F 9/505; G06F 9/5055; G06F 9/45558; G06F 2009/45595; G06F 8/63; G06F 9/5072; H04L 67/1002; H04L 43/08
  See application file for complete search history.

(56) References Cited

U.S. PATENT DOCUMENTS

| | | | | |
|---|---|---|---|---|
| 9,647,892 B2* | 5/2017 | Horman | ................. | H04L 43/08 |
| 2007/0072618 A1* | 3/2007 | Freytsis | ............. | H04L 67/1002 |
| | | | | 455/452.2 |
| 2010/0023949 A1* | 1/2010 | Jackson | ................ | G06F 9/5072 |
| | | | | 718/104 |
| 2014/0189127 A1* | 7/2014 | Chagam | .................... | G06F 8/63 |
| | | | | 709/226 |

\* cited by examiner

*Primary Examiner* — Eric C Wai
(74) *Attorney, Agent, or Firm* — Knobbe Martens Olson & Bear LLP

(57) ABSTRACT

Systems and methods are described for managing reuse of sandboxed computing environments in a network-based on-demand code execution system. Users may generate tasks on the system by submitting code to a frontend, which may interact with multiple worker managers that manage task execution in sandboxed computing environments such as containers or virtual machine instances. A sandbox may be reusable once provisioned, but the resources required to definitively locate an idle sandbox may be significant relative to the cost of provisioning a new sandbox. The system may therefore manage reuse by randomly or semi-randomly selecting a worker manager and requesting that it provide an existing sandbox if one is available. If not, then the system may select a different worker manager and repeat the request, or after consuming a threshold amount of resources may request that the next worker manager provision a new sandbox if an existing one is not available.

21 Claims, 7 Drawing Sheets

MANAGING SANDBOX REUSE IN AN ON-DEMAND CODE EXECUTION SYSTEM

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources.

In some scenarios, a user can request that a data center provide computing resources to execute a particular task. The task may correspond to a set of computer-executable instructions, which the data center may then execute on behalf of the user. The data center may thus further facilitate increased utilization of data center resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
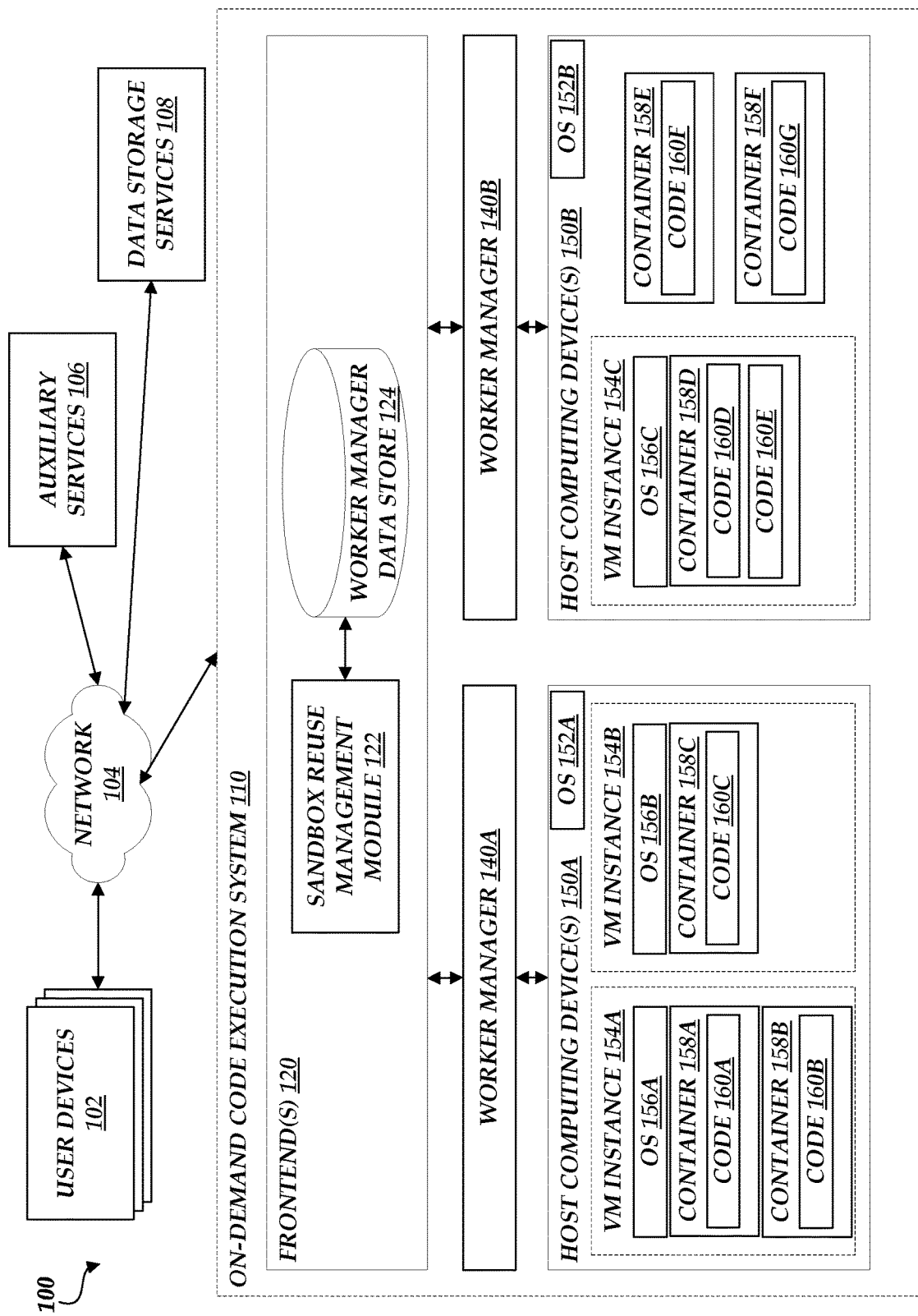
FIG. 1 is a block diagram depicting an illustrative environment in which an on-demand code execution system can execute tasks corresponding to code, which may be submitted by users of the on-demand code execution system, and can manage the reuse of previously provisioned sandboxes in accordance with aspects of the present disclosure.

Generally described, aspects of the present disclosure relate to an on-demand code execution system that enables rapid execution of code. More specifically, embodiments of the present disclosure relate to improving the performance of an on-demand code execution system by implementing a sandbox reuse management system. As described in detail herein, an on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed by the on-demand code execution system. Individual implementations of the task on the on-demand code execution system may be referred to as an "execution" of the task (or a "task execution"). The on-demand code execution system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user).

The on-demand code-execution system may thus allow users to execute code in a serverless environment (e.g., one in which the underlying server is not under user control). The term "serverless environment," as used herein, is intended to refer to an environment in which responsibility for managing generation, configuration, and state of an underlying execution environment is abstracted away from a user, such that the user need not, for example, create the execution environment, install an operating system within the execution environment, or manage a state of the environment in order to execute desired code in the environment. Similarly, the term "server-based environment" is intended to refer to an environment in which a user is at least partly responsible for managing generation, configuration, or state of an underlying execution environment in addition to executing desired code in the environment. One skilled in the art will thus appreciate that "serverless" and "server-based" may indicate the degree of user control over execution environments in which code is executed, rather than the actual absence or presence of a server.

The on-demand code execution system may execute the code associated with a user-submitted task in a sandbox. The term "sandbox," as used herein, may generally refer to any computing environment that isolates the code associated with the user-submitted task from code associated with other tasks. Examples of sandboxes may include isolated userspace instances (which may be referred to herein as "containers"), virtual machine instances, host computing devices, or various combinations thereof. In some embodiments, a host computing device may host multiple sandboxes, which may be configured as, e.g., containers in a virtual machine instance that is hosted on a host computing device. In other embodiments, a host computing device may itself be configured as a sandbox. The on-demand code execution system will generally execute each of the user-submitted tasks in its own sandbox, and may provision sandboxes as needed to support on-demand code execution. In some embodiments, a sandbox reuse management system may manage or facilitate the creation of sandboxes to execute user-submitted tasks.

In some embodiments, a sandbox that has been provisioned to execute a particular task may be reused. For example, the on-demand code execution system may provision a sandbox to execute a first task, execute the first task to completion, and then reuse the sandbox to execute a second task (which may be completely unrelated to the first task). The on-demand code execution system may thus reduce the time and resources needed to execute subsequent tasks, since the overhead cost of provisioning the sandbox is only incurred once. However, the overhead costs associated with finding an available sandbox may make reuse less practical: Tasks in the on-demand code execution system may typically execute within milliseconds of a user submitting a request, and the time and resources required to systematically locate an "empty" sandbox may be greater than the resource cost of provisioning a new sandbox. For example, the on-demand code execution system may comprise thousands of host computing devices hosting tens of thousands of sandboxes, and these sandboxes may change from "in use" status to "available for reuse" status more quickly than these statuses can be reported. The on-demand code execution system may thus be unable to obtain information that is both accurate and timely regarding the availability of sandboxes for reuse.

To address these issues, the on-demand code execution system may implement a sandbox reuse management system as described herein. The sandbox reuse management system may enable sandbox reuse without incurring the overhead costs of tracking the availability states of individual sandboxes, and may thereby improve the efficiency of the on-demand code execution system.

As described in more detail below, the on-demand code execution system may include worker managers configured to receive user code (threads, programs, etc., composed in any of a variety of programming languages) and execute the code in a highly scalable, low latency manner, without requiring user configuration of a sandbox. Specifically, the worker manager can create and configure sandboxes according to a predetermined set of configurations, each corresponding to any one or more of a variety of run-time environments. The worker manager can create and configure these sandboxes prior to receiving the user code and prior to receiving any information from a user regarding any particular sandbox configuration. Thereafter, the worker manager receives user-initiated requests to execute code, and identifies a pre-configured sandbox to execute the code based on configuration information associated with the request.

The worker manager can further allocate the sandbox to execute the user's code at least partly by creating and configuring containers inside an allocated virtual machine instance, and provisioning the containers with code of the task as well as any dependency code objects. Various embodiments for implementing a worker manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

As will be appreciated by one of skill in the art in light of the present disclosure, the embodiments disclosed herein improves the ability of computing systems, such as on-demand code execution systems, to execute code in an efficient manner. Moreover, the presently disclosed embodiments address technical problems inherent within computing systems; specifically, the problem of identifying resources that are available for reuse in a system where resource states are changing too rapidly to be monitored. These technical problems are addressed by the various technical solutions described herein, including the provisioning of a sandbox reuse management system within an on-demand code execution system to facilitate finding and reusing sandboxes without incurring significant tracking and overhead costs. Thus, the present disclosure represents an improvement on existing data processing systems and computing systems in general.

While a virtual machine executing an operating system is described herein as one example of an execution environment, other execution environments are also possible. For example, tasks or other processes may be executed within a container, which provides a runtime environment without itself providing virtualization of hardware. Containers may be implemented within virtual machines to provide additional security, or may be run outside of a virtual machine instance.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention.

Furthermore, embodiments of the invention may include several novel features, no single one of which is solely responsible for its desirable attributes or which is essential to practicing the inventions herein described.

FIG. 1 is a block diagram of an illustrative operating environment 100 in which an on-demand code execution system 110 may operate based on communication with user computing devices 102, auxiliary services 106, and network-based data storage services 108. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLIs), application programing interfaces (APIs), and/or other programmatic interfaces for generating and uploading user-executable code (including metadata identifying dependency code objects for the uploaded code), invoking the user-provided code (e.g., submitting a request to execute the user code on the on-demand code execution system 110), scheduling event-based jobs or timed jobs, tracking the user-provided code, and/or viewing other logging or monitoring information related to their requests and/or user code. Although one or more embodiments may be described herein as using a user interface, it should be appreciated that such embodiments may, additionally or alternatively, use any CLIs, APIs, or other programmatic interfaces.

The illustrative environment 100 further includes one or more network-based data storage services 108, which are configured to enable the on-demand code execution system 110 to store and retrieve data from one or more persistent or substantially persistent data sources. Illustratively, the network-based data storage services 108 may enable the on-demand code execution system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the on-demand code execution system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the operating environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, and as described in more detail below, the on-demand code execution system 110 may configure the virtual machine instances with customized operating systems to execute the user's code more efficiency and reduce utilization of computing resources.

To enable interaction with the on-demand code execution system 110, the system 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface providing user computing devices 102 with the ability to upload or otherwise communication user-specified code to the on-demand code execution system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. As noted above, the code for a task may reference additional code objects maintained at the on-demand code execution system 110 by use of identifiers of those code objects, such that the code objects are combined with the code of a task in an execution environment prior to execution of the task. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

A call to execute a task may specify one or more third-party libraries (including native libraries) to be used along with the user code corresponding to the task. In one embodiment, the call may provide to the on-demand code execution system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network). In some embodiments, individual code objects may also be associated with permissions or authorizations. For example, a third party may submit a code object and designate the object as readable by only a subset of users. The on-demand code execution system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

In the illustrated embodiment, the frontend 120 can include a sandbox reuse management module 122, which may implement various aspects of the present disclosure as described in more detail below. The frontend 120 can further include a worker manager data store 124, which may store various information regarding worker managers 140A-B, virtual machine instances 154A-C, containers 160A-G, and so forth. Illustratively, the worker manager data store 124 can be any non-transient computer-readable storage medium, including, e.g., hard drives, solid state devices, optical drives, magnetic media, databases, and the like. In some embodiments, all or part of the worker manager data store 124 can be implemented on the data storage services 108 or the auxiliary services 106.

To manage requests for code execution, the frontend 120 can include an execution queue (not shown in FIG. 1), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

As noted above, tasks may be triggered for execution at the on-demand code execution system 110 based on explicit calls from user computing devices 102 (e.g., as received at the request interface). Alternatively or additionally, tasks may be triggered for execution at the on-demand code execution system 110 based on data retrieved from one or more auxiliary services 106 or network-based data storage services 108. To facilitate interaction with auxiliary services 106, the frontend 120 can include a polling interface (not shown in FIG. 1), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the on-demand code execution system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further include an output interface (not shown in FIG. 1) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the active pool 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more worker managers 140 that manage the instances used for servicing incoming calls to execute tasks. In the example illustrated in FIG. 1, each worker manager 140 manages an active pool of virtual machine instances 154A-C, which are currently assigned to one or more users and are implemented by one or more physical host computing devices 150A-B. The physical host computing devices 150A-B and the virtual machine instances 154A-C may further implement one or more containers 158A-F, which may contain and execute one or more user-submitted codes 160A-G. Containers are logical units created within a virtual machine instance, or on a host computing device, using the resources available on that instance or device. For example, each worker manager 140 may, based on information specified in a call to execute a task, create a new container or locate an existing container 158A-F and assign the container to handle the execution of the task. Each container may correspond to an execution environment for the task, providing at least some isolation from other execution environments. For example, each container may provide a file system isolated from other file systems on the device, and code executing in the container may have limited or no access to other file systems or memory space associated with code executing outside of the container.

The containers 156A-F, virtual machine instances 154A-C, and host computing devices 150A-B may further include language runtimes, code libraries, or other supporting functions (not depicted in FIG. 1) that facilitate execution of user-submitted code 160A-G. The physical computing devices 150A-B and the virtual machine instances 154A-C may further include operating systems 152A-B and 156A-C. In various embodiments, operating systems 152A-B and 156A-C may be the same operating system, variants of the same operating system, different operating systems, or combinations thereof.

Although the virtual machine instances 154A-C are described here as being assigned to a particular user, in some embodiments, an instance 154A-C may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

As shown in FIG. 1, various combinations and configurations of host computing devices 150A-B, virtual machine instances 154A-C, and containers 158A-F may be used to facilitate execution of user submitted code 160A-G. In the illustrated example, the host computing device 150A implements two virtual machine instances 154A and 154B. Virtual machine instance 154A, in turn, implements two containers 158A and 158B, which contain user-submitted code 160A and 160B respectively. Virtual machine instance 154B implements a single container 158C, which contains user-submitted code 160C. The host computing device 150B further implements a virtual machine instance 154C and directly implements containers 158E and 158F, which contain user-submitted code 160F and 160G. The virtual machine instance 154C, in turn, implements container 158D, which contains user-submitted codes 160D and 160E. It will be understood that these embodiments are illustrated for purposes of example, and that many other embodiments are within the scope of the present disclosure.

While some functionalities are generally described herein with reference to an individual component of the on-demand code execution system 110, other components or a combination of components may additionally or alternatively implement such functionalities. For example, a worker manager 140 may operate to provide functionality associated with execution of user-submitted code as described herein with reference to the transaction execution system 170.

Figure 2:
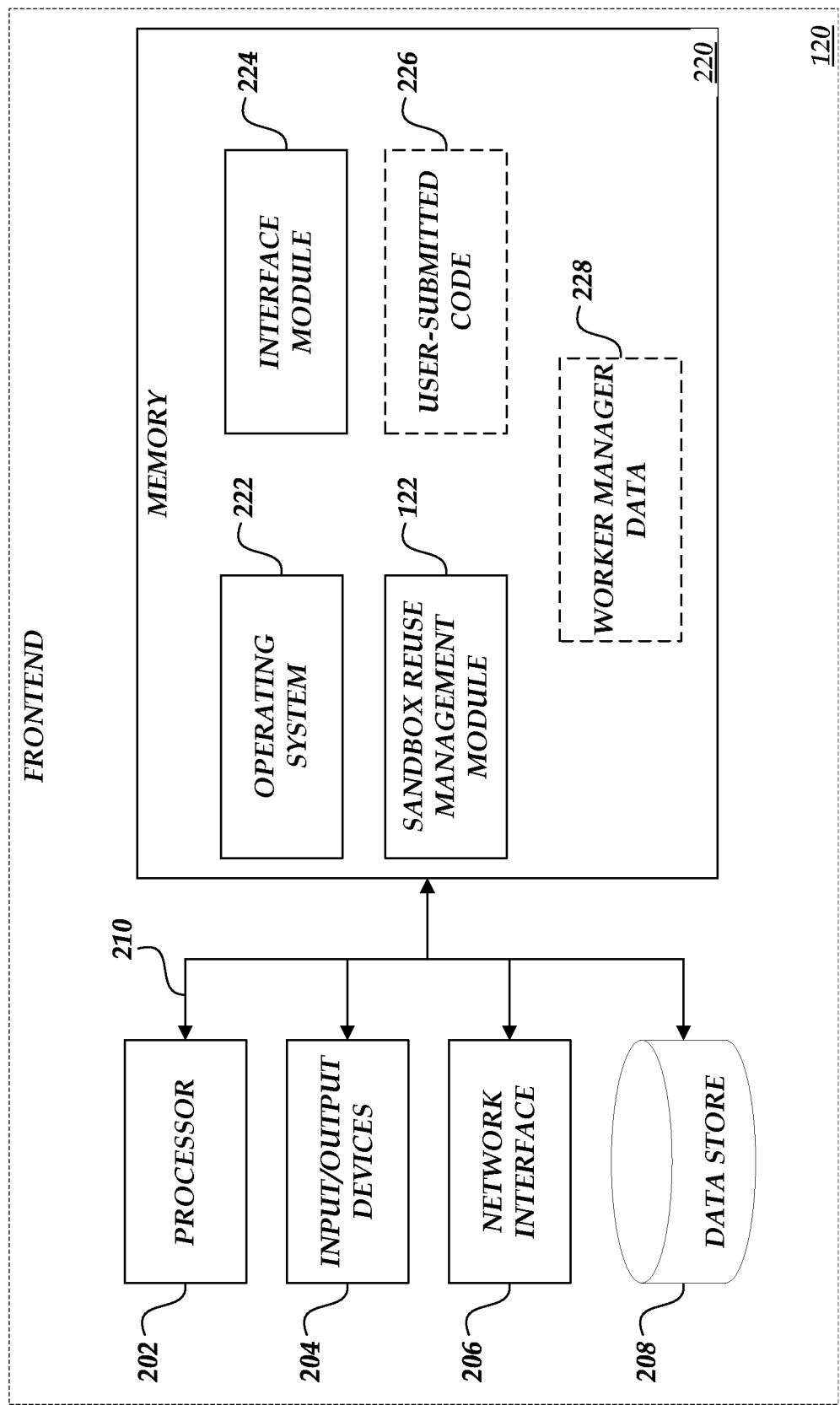
FIG. 2 depicts a general architecture of a computing device providing a frontend that is configured to manage sandbox reuse in the on-demand code execution system of FIG. 1.

FIG. 2 depicts a general architecture of a computing system (referenced as frontend 120) that operates to manage sandbox reuse within the on-demand code execution system 110. The general architecture of the frontend 120 depicted in FIG. 2 includes an arrangement of computer hardware and software modules that may be used to implement aspects of the present disclosure. The hardware modules may be implemented with physical electronic devices, as discussed in greater detail below. The frontend 120 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the frontend 120 includes a processor 202, input/output device interfaces 204, a network interface 206, and a data store 208, all of which may communicate with one another by way of a communication bus 210. The network interface 206 may provide connectivity to one or more networks or computing systems. The processor 202 may thus receive information and instructions from other computing systems or services via the network 104. The processor 202 may also communicate to and from a memory 220 and further provide output information for an optional display (not shown) via the input/output device interfaces 204. The input/output device interfaces 204 may also accept input from an optional input device (not shown).

The memory 220 may contain computer program instructions (grouped as modules in some embodiments) that the processor 202 executes in order to implement one or more aspects of the present disclosure. The memory 220 generally includes random access memory (RAM), read only memory (ROM) and/or other persistent, auxiliary or non-transitory computer readable media. The memory 220 may store an operating system 222 that provides computer program instructions for use by the processor 202 in the general administration and operation of the frontend 120. The memory 220 may further include computer program instructions and other information for implementing aspects of the present disclosure. For example, in one embodiment, the memory 220 includes an interface module 224 that generates interfaces (and/or instructions therefor) for interacting with the transaction execution system 170, e.g., via an API, CLI, and/or Web interface. In addition, the memory 220 may include and/or communicate with one or more data repositories (not shown), for example, to access user program codes and/or libraries.

In addition to and/or in combination with the interface module 224, the memory 220 may include a sandbox reuse management module 122 that may be executed by the processor 202. In one embodiment, the sandbox reuse management module 122 implements various aspects of the present disclosure, e.g., managing reuse of previously provisioned sandboxes, as described further below. While the sandbox reuse management module 122 is shown in FIG. 2 as part of the frontend 120, in other embodiments, all or a portion of the sandbox reuse management module 122 may be implemented by other components of the on-demand code execution system 110 and/or another computing device. For example, in certain embodiments of the present disclosure, another computing device in communication with the on-demand code execution system 110 may include several modules or components that operate similarly to the modules and components illustrated as part of the sandbox reuse management module 122.

The memory 220 may further include user-submitted code 226, which may be loaded into memory in conjunction with a user-submitted request to execute a task on the on-demand code execution system 110. The memory 220 may further include worker manager data 228, which may be generated or obtained by the sandbox reuse management module 122 and may be used to identify worker managers that may have suitable sandboxes or that may have sandboxes available for reuse.

In some embodiments, the frontend 120 may further include components other than those illustrated in FIG. 2. For example, the memory 220 may further include results of executing the user-submitted code 226, metadata or other information that was submitted with the request to execute the user-submitted code 226, or data regarding individual sandboxes and their characteristics (e.g., whether a sandbox has been provisioned with a particular processor or a specified amount of memory). FIG. 2 is thus understood to be illustrative but not limiting.

Figure 3A:
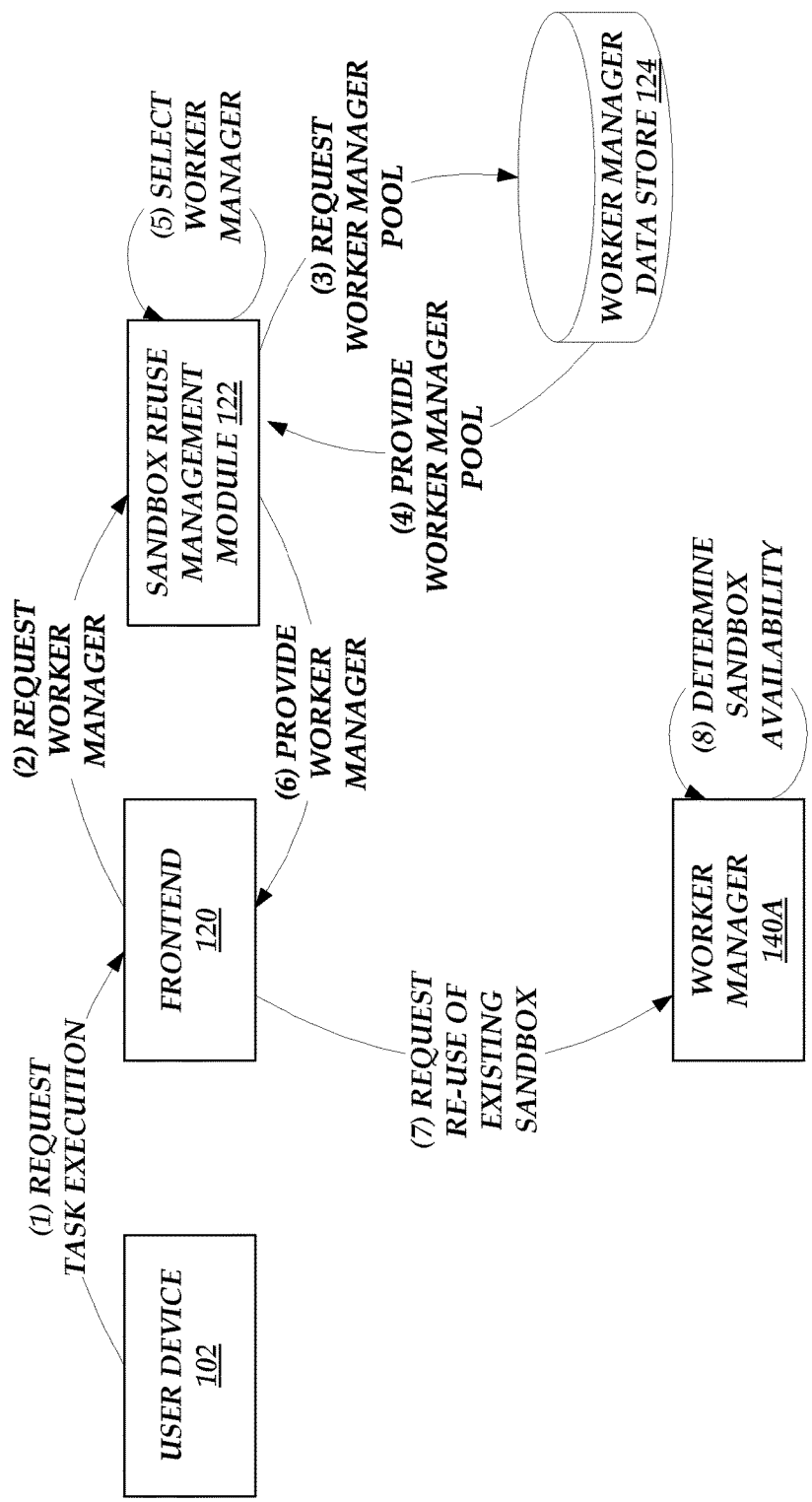
FIGS. 3A, 3B, 3C, and 3D are flow diagrams depicting illustrative interactions for submitting code corresponding to a task to the on-demand code execution system of FIG. 1.

FIGS. 3A, 3B, 3C, and 3D depict illustrative interactions for managing reuse of sandboxes in accordance with aspects of the present disclosure. With reference now to FIG. 3A, at (1), a user device 102 sends a request via a frontend 120 that an on-demand code execution system execute a particular task. The task may illustratively be associated with code that a user previously submitted to the on-demand code execution system, or in some embodiments code may be included as part of the request to execute a task. While the request is shown in FIG. 3A as stemming from the user device 102, in some embodiments, other devices may additionally or alternatively request task execution. For example, a different device external to the on-demand code execution system 110 (e.g., an auxiliary service 106) may request execution of a task. In some instances, the on-demand code execution system 110 itself may request execution of a task (e.g., by detecting fulfillment of a triggering event for the task).

At (2), the frontend 120 requests that the sandbox reuse management module 122 identify a worker manager that may have a previously provisioned sandbox available to execute the requested task. In some embodiments, the task may require a sandbox that is provisioned with particular features, such as a specified software library or other characteristic. The sandbox reuse management module 122 may therefore request at (3) that the worker manager data store 124 identify worker managers that have previously provisioned a sandbox with the requested characteristics. In other embodiments, the sandbox reuse management module 122 may apply other criteria when querying the worker manager data store 124 for a pool of worker managers. For example, the sandbox reuse management module 122 may query the worker manager data store 124 for worker managers that have recently fulfilled a request for a sandbox, or for worker managers that have a threshold success rate at fulfilling requests to reuse sandboxes. As further examples, the sandbox reuse management module 122 may, in some embodiments, query the worker manager data store 124 for worker managers in a particular geographic region, worker managers that can fulfill the request at or below a particular resource cost, or worker managers that can fulfill the request within a particular timeframe. In further embodiments, the worker manager data store 124 may return a pool of worker managers that have provisioned at least one sandbox. At (4), the worker manager data store 124 provides information identifying the pool of worker managers.

At (5), the sandbox reuse management module 122 selects a worker manager from the pool of worker managers. Illustratively, the sandbox reuse management module 122 may randomly select a worker manager from the pool of worker managers that have a suitable sandbox. In some embodiments, the sandbox reuse management module 122 may apply weighting factors or other criteria to the selection of a worker manager. For example, the sandbox reuse management module may favor worker managers that have recently fulfilled requests to reuse a sandbox, or may disfavor worker managers that consistently (e.g., over a specified period of time) report they do not have a sandbox available for reuse. In other embodiments, the sandbox reuse management module 122 may apply a weighting factor based on a success rate of the worker manager at fulfilling previous requests to provide a previously provisioned sandbox.

At (6), the sandbox reuse management module 122 provides the selected worker manager (e.g., worker manager 140A) to the frontend 120, which at (7) attempts to reserve a previously provisioned sandbox on the worker manager 140A. At (8), the worker manager 140A determines whether one of the host computing devices it manages is provisioned with a sandbox that satisfies the request and is available for reuse. In some embodiments, the worker manager 140A has a suitable sandbox available for reuse. In these embodiments, the interactions depicted in FIG. 3D are carried out and the interactions depicted in FIGS. 3B and 3C are omitted.

Figure 3B:
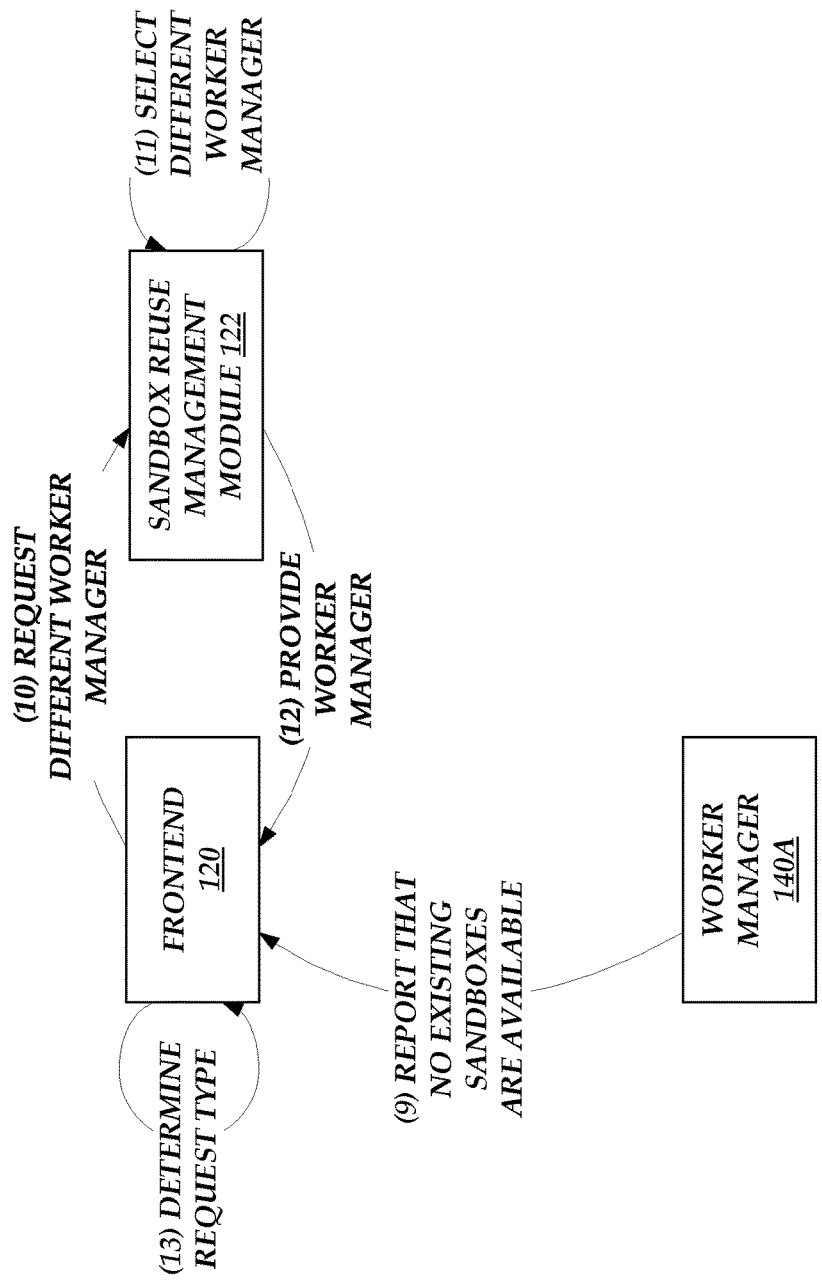
Figure 3C:
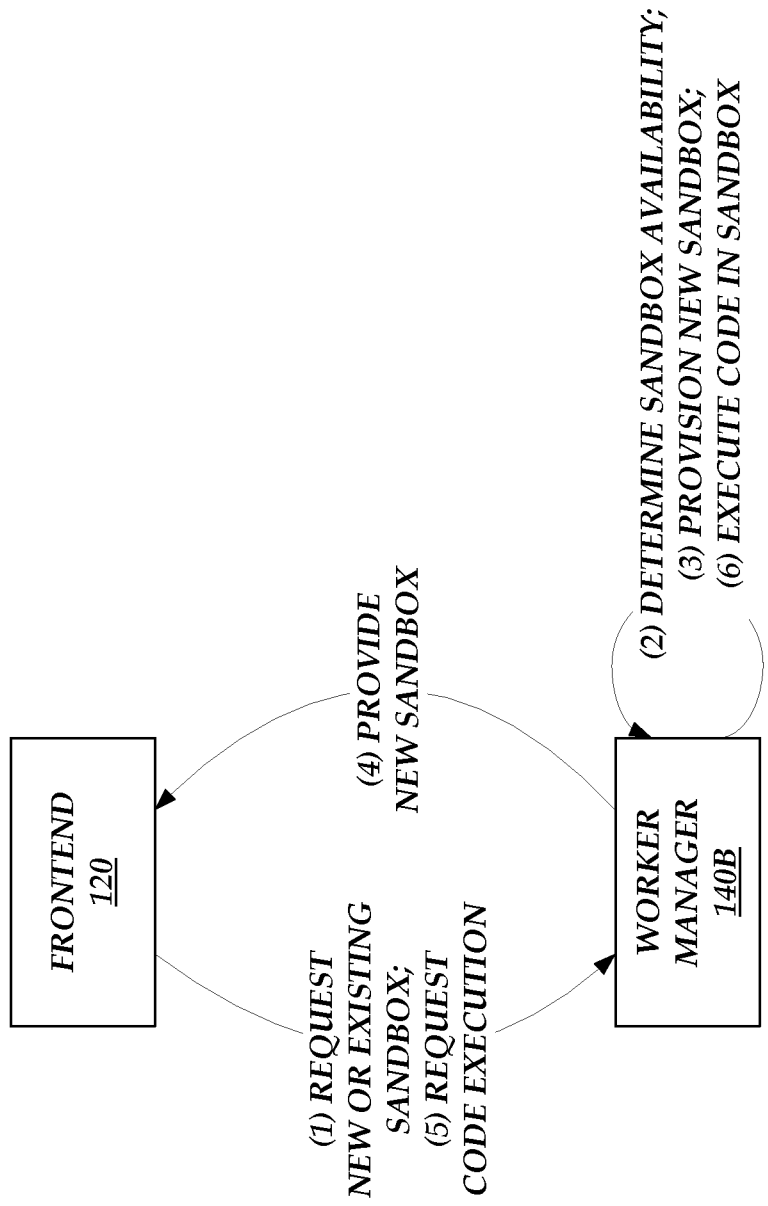
Figure 3D:
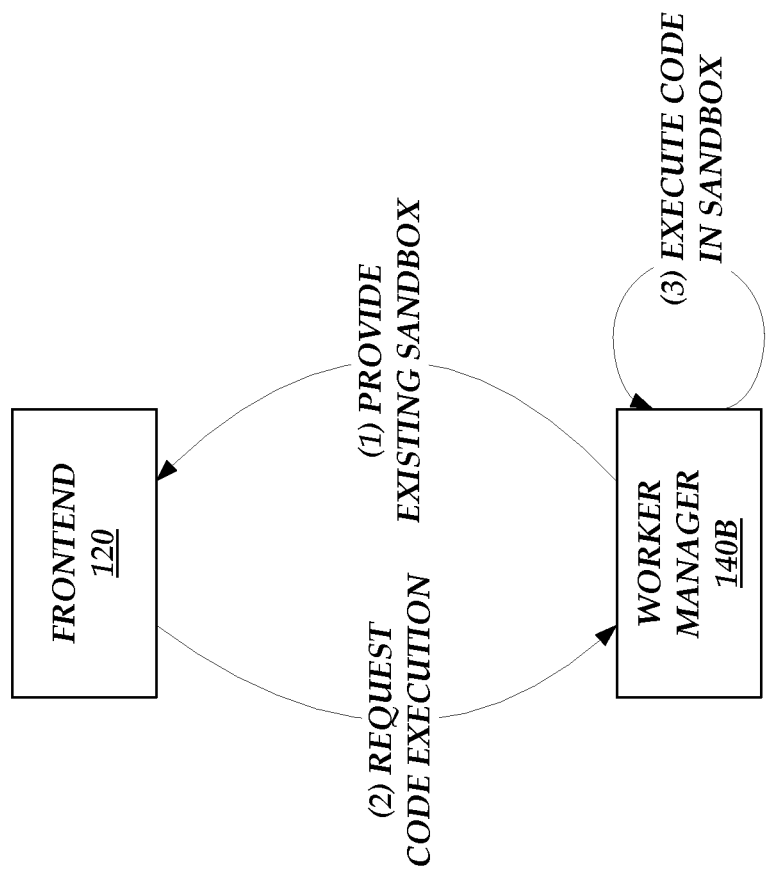

In other embodiments, and with reference now to FIG. 3B, at (9), the worker manager 140A reports that it does not have an existing sandbox available to fulfill the request. In some embodiments, the worker manager 140A may indicate that it does not have (or that it no longer has) a previously provisioned sandbox that can be used to execute the user-submitted task. For example, the task may require a particular operating system, and the worker manager 140A may not have a sandbox with the specified operating system. In other embodiments, the worker manager 140A may indicate that it has a suitable sandbox, but the sandbox is currently being used to execute a different task and therefore is not available. In further embodiments, the worker manager 140A may indicate that it does not currently have a suitable sandbox, but has the resources to provision one upon request. The frontend 120 may, in some embodiments, instruct the worker manager 140A to proceed with provisioning a suitable sandbox while it continues to look elsewhere for an existing sandbox, and may limit the scope of its search based on how long provisioning a sandbox on the worker manager 140A is predicted to take.

At (10), the frontend 120 may request that the sandbox reuse management module 122 identify a different worker manager from the pool of worker managers. In some embodiments, the sandbox reuse management module 122 may store information regarding the response from the worker manager 140A (e.g., that the worker manager 140A did not fulfill the request) in the worker manager data store 124. At (11), the sandbox reuse management module 122 may select a different worker manager from the pool. In various embodiments, the selection of a different worker manager at (11) may be random, or may be based on any of the criteria described above with regard to the interaction at (5). At (12), the sandbox reuse management module 122 provides information identify a different worker manager (e.g., worker manager 140B) to the frontend 120.

At (13), the frontend 120 (or, in some embodiments, the sandbox reuse management module 122) determines the type of request to make to the worker manager 140B. In some embodiments, the frontend 120 may determine that the request to reserve a previously provisioned sandbox should be repeated. In other embodiments, the frontend 120 may determine that the request should specify that the worker manager 140B is to create a new sandbox if there is not a previously provisioned sandbox available to execute the task. Illustratively, the frontend 120 may determine which request to make based on criteria such as the number of attempts made to request a previously provisioned sandbox, the amount of time elapsed since the user request to execute the task was received, recent success rates at finding available sandboxes, or other factors. In some embodiments, the criteria may be based on the amount of time or resources needed to provision a new sandbox, which may vary according to characteristics of the user-submitted task. For example, the frontend 120 may store information for a particular task indicating the time and resources that were needed to provision sandboxes for previous executions of the task, and may determine how many attempts should be made to locate an existing sandbox based on the time and resources required to provision a new sandbox for the task.

The frontend 120 may further determine the time or resources it should allocate to attempting to find a previously provisioned sandbox based on its historical success rates at finding sandboxes. For example, the frontend 120 may determine that recent attempts to find an existing sandbox had an average success rate of 12%, and may further determine that the cost of provisioning a new sandbox is approximately 2.5× the cost of each attempt to locate an existing sandbox. The frontend 120 accordingly determine that it should not invest further time and resources into seeking to avoid the cost of provisioning a new sandbox, since it would likely consume more resources in the attempt.

In some embodiments, the frontend 120 may determine how much time or resources to spend trying to reserve an existing sandbox based on a performance guarantee associated with the user-submitted task. For example, the on-demand code execution system may guarantee that the user-submitted task will be executed within a specified amount of time or that execution will consume less than a specified amount of computing resources. The frontend 120 may determine how many attempts to make when trying to reserve an existing sandbox based on a time or resource budget derived from the performance guarantee. In some embodiments, the frontend 120 may determine a sandbox reuse request budget based on achieving an average latency or not exceeding a peak latency.

If the interaction at (13) determines that another attempt should be made to reserve an existing sandbox, then the interactions at (7) and (8) may be repeated for the worker manager 140B. If the worker manager 140B does not have a sandbox available, then the interactions at (9) through (13) may be repeated and a third worker manager may be selected. The interactions at (7) and (8), and potentially the interactions at (9) through (13), may thus be repeated a number of times. If and when the interaction at (13) determines that a further attempt should not be made (either when the interaction is first carried out or in subsequent iterations), then the interactions depicted in FIG. 3C may be carried out. Similarly, if and when the interaction at (8) determines that an existing sandbox is available, then the interactions depicted in FIG. 3D may be carried out.

FIG. 3C depicts example interactions for reserving an existing sandbox if one is available and creating a new sandbox if not. With reference now to FIG. 3C, at (1), the frontend 120 may issue a request that the most recently selected worker manager (e.g., worker manager 140B) provide a sandbox regardless of whether the worker manager 140B has an existing sandbox to reuse. At (2), the worker manager 140B may determine whether it can make an existing sandbox available. If the worker manager 140B determines that an existing sandbox is not available, then at (3) the worker manager 140B provisions a new sandbox, and at (4) provides information enabling the frontend 120 to access the new sandbox. If the worker manager 140B instead determines that an existing sandbox is available, then the interactions depicted in FIG. 3D may be carried out. In some embodiments, the frontend 120 may store information regarding the worker manager 140B and the provisioning of a new sandbox in the worker manager data store 124. At (4), the frontend 120 may request execution of the user-submitted code associated with the task in the newly provisioned sandbox, and at (5) the worker manager 140B may execute the code in the sandbox.

FIG. 3D depicts example interactions that may be carried out if an existing sandbox is available for reuse. Although FIG. 3D depicts the worker manager 140B carrying out interactions, it will be understood that interactions depicted in FIG. 3D may be carried out by other worker managers (e.g., the worker manager 140A) if and when they determine they can make an existing sandbox available. At (1), the worker manager 140B may provide information that enables the frontend 120 to access and reuse the existing sandbox. At (2), the frontend 120 requests execution of the user-submitted code in the existing sandbox, and at (3) the worker manager executes the user-submitted code in the existing sandbox. In some embodiments, the worker manager 140B may reset or restore the previously provisioned sandbox in order to prevent any information generated by or associated with the task that previously executed in the sandbox from being made available to the current task.

It will be understood that FIGS. 3A, 3B, 3C, and 3D are provided for purposes of example, and that many variations on the depicted interactions are within the scope of the present disclosure. For example, the interaction at (13) in FIG. 3B may be carried out prior to the interaction at (7) in FIG. 3A, and the frontend 120 may thus determine whether any attempts at all to reuse an existing sandbox should be made. As a further example, the sandbox reuse management module 122 may interact directly with the worker managers 140A and 140B rather than communicating via the frontend 120. FIGS. 3A, 3B, 3C, and 3D are thus understood to be illustrative and not limiting.

Figure 4:
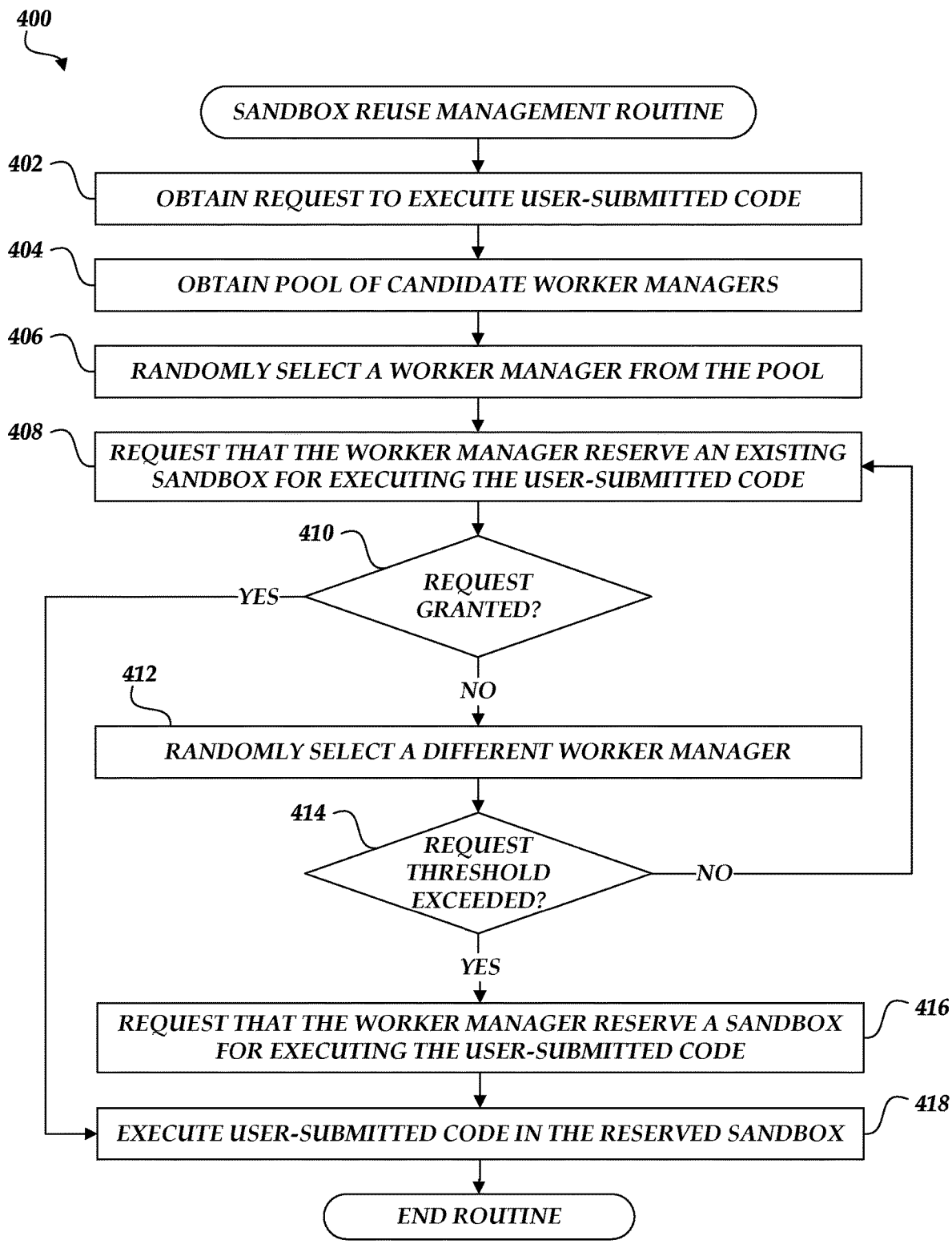
FIG. 4 is a flow chart depicting an illustrative routine for managing sandbox reuse in the on-demand code execution system of FIG. 1.

FIG. 4 is a flow diagram of an illustrative routine 400 for managing sandbox reuse in accordance with aspects of the present disclosure. The routine 400 may be carried out, for example, by the sandbox reuse management module 122 or other components of the frontend 120. The routine 400 begins at block 402, where a request to execute user-submitted code may be obtained. In some embodiments, the request may specify particular requirements for the execution environment in which the code is to be run, such as a particular amount of memory or a dependency on a software library. In other embodiments, execution environment requirements may be determined based on, e.g., an analysis of the user-submitted code, previous executions of the user-submitted code, or other criteria.

At block 404, a pool of candidate worker managers may be obtained. In various embodiments, the pool of worker managers may be determined based on criteria such as already having provisioned at least one sandbox that meets criteria specified in the request, criteria determined based on an analysis of the code or on previous executions of the code, geographic locations, resource costs, performance guarantees, or other criteria. In some embodiments, the pool of worker managers may be determined based on criteria related to sandbox availability, such as a threshold success rate at fulfilling previous requests for sandbox reuse.

At block 406, a worker manager may be selected from the pool of worker managers. In some embodiments, the worker manager may be selected purely at random. In other embodiments, the selection may be weighted based on criteria such as the worker manager having recently fulfilled a request to provision or reuse a sandbox, a worker manager's success rate over time at fulfilling requests to reuse sandboxes, or other factors. For example, a worker manager having a success rate of 40% may be twice as likely to be selected as a worker manager having a success rate of 20%. At block 408, a reservation request may be transmitted to the selected worker manager, requesting that the worker manager reserve an existing sandbox if it has one available (e.g., if it has previously provisioned a sandbox meets the execution environment criteria and that sandbox is not current being used to execute another task). For example, the worker manager may have previously provisioned a sandbox for execution of a different task, and the task may have run to completion. The provisioned sandbox may therefore be available for use, and may meet the criteria associated with the current task.

At decision block 410, a determination may be made as to whether the selected worker manager was able to grant the request to reserve an existing sandbox for reuse. If so, then the routine 400 branches to block 418, where the user-submitted code may be executed in the reserved sandbox, and the routine 400 then ends. In various embodiments, however, the worker manager may not be able to grant the request. For example, the worker manager may have previously provisioned a suitable sandbox, but then de-provisioned it to free up resources and hence the sandbox is no longer available. As a further example, the worker manager may have a suitable sandbox, but the sandbox is not available because it is currently being used to execute another task. Still further, the worker manager may a have an idle sandbox that does not meet all of the criteria for the task execution environment, such as having a particular software library or a particular operating system in the sandbox. Accordingly, if the determination at decision block 410 is that the worker manager could not grant the request, then at block 412 a different worker manager may be selected. Like the selection at block 406, the selection of a different worker manager may be purely random, or may be weighted based on the criteria described above. It will be understood that block 412 may be carried out more than once and will select a different worker manager each time.

At decision block 414, a determination may be made as to whether a threshold for requesting sandboxes has been exceeded. As described above, the threshold may include an amount of time, number of requests, consumption of a computing resource, or other limitation on the number of times that blocks 408, 410, 412, and 414 will be carried out. If the determination at block 414 is that the threshold has not been exceeded, then the routine 400 branches to block 408 and iterates until either a request is granted or the threshold is satisfied.

If the determination at block 414 is that the request threshold has been satisfied, then at block 416 a request may be transmitted to the worker manager that it reserve a new or existing sandbox for executing the user-submitted code. The worker manager may thus respond to the request by reserving an existing sandbox, if one is available, or by creating a new sandbox and reserving it. The request at block 416 may thus succeed even if the worker manager does not have a sandbox available for reuse, in contrast to the request at block 408 (which will only succeed if the worker manager can make an existing sandbox available). The routine 400 then continues at block 418, where the user-submitted code may be executed in the sandbox reserved at block 416.

It will be understood that FIG. 4 is provided for purposes of example, and that many variations on the illustrated routine 400 are within the scope of the present disclosure. For example, the routine 400 may include determining the request threshold based on analyses of the user-submitted code, recently submitted requests to reuse sandboxes, average time or resources consumed in the creation of sandboxes, or other criteria. As a further example, decision block 414 may be carried out prior to block 408, such that the routine 400 can determine that it should not attempt to reuse a sandbox (e.g., because a size of the pool of worker managers did not satisfy a threshold). FIG. 4 is thus understood to be illustrative and not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for managing reuse of sandboxes in an on-demand code execution system, the system comprising:
a non-transitory data store configured to store identifications of worker managers and computer-executable instructions; and
a computing device in communication with the non-transitory data store, wherein the computer-executable instructions, when executed by the computing device, configure the computing device to:
obtain a request to execute a user-submitted task on an on-demand code execution system;
obtain an identification of a plurality of worker managers, each of the plurality of worker managers managing one or more computing devices provisioned with one or more sandboxes for executing user-submitted tasks on the on-demand code execution system, each of the one or more sandboxes providing an isolated code execution environment;
randomly select a first worker manager from the plurality of worker managers;
transmit, to the first worker manager, a first reservation request for a previously provisioned sandbox on the one or more computing devices managed by the first worker manager;
receive, from the first worker manager, a first response indicating that no previously provisioned sandbox is available to fulfill the first reservation request;
randomly select a second worker manager from the plurality of worker managers;
transmit, to the second worker manager, a second reservation request for a sandbox on the one or more computing devices managed by the second worker manager;

receive, from the second worker manager, a second response, the second response including information enabling access to the sandbox; and cause the user-submitted task to be executed in the sandbox.

2. The system of claim 1, wherein the sandbox comprises a previously provisioned sandbox on the one or more computing devices managed by the second worker manager.

3. The system of claim 1, wherein the sandbox comprises a sandbox that was provisioned by the second worker manager in response to the second reservation request.

4. The system of claim 1, wherein the sandbox comprises one or more of a container, a virtual machine instance, or a computing device.

5. The system of claim 1, wherein the computing device obtains the identification of the plurality of worker managers based at least in part on responses to previous reservation requests.

6. A computer-implemented method comprising:

obtaining a request to execute a user-submitted task on an on-demand code execution system;

selecting, based at least in part on a first criterion, a first worker manager from a plurality of worker managers provisioned with one or more sandboxes;

transmitting, to the first worker manager, a first reservation request for a previously provisioned sandbox;

receiving, from the first worker manager, a first response indicating that no previously provisioned sandbox is available to fulfill the first reservation request;

selecting, based at least in part on the first criterion, a second worker manager from the plurality of worker managers;

transmitting, to the second worker manager, a second reservation request for a sandbox;

receiving, from the second worker manager, the requested sandbox; and causing the user-submitted task to be executed in the requested sandbox.

7. The computer-implemented method of claim 6 further comprising obtaining the plurality of worker managers.

8. The computer-implemented method of claim 6, wherein the first criterion comprises a random selection.

9. The computer-implemented method of claim 6, wherein the first criterion comprises a weighted random selection based at least in part on previous responses to reservation requests.

10. The computer-implemented method of claim 6, wherein the second reservation request specifies that a previously provisioned sandbox should be provided if available and a new sandbox should be provisioned if not.

11. The computer-implemented method of claim 6, wherein transmitting the second reservation request for the sandbox is in response to a determination that a threshold has been satisfied.

12. The computer-implemented method of claim 11, wherein the threshold comprises one or more of a threshold number of reservation requests, a threshold amount of time elapsed since obtaining the request to execute the user-submitted task, or a threshold percentage of declined reservation requests.

13. The computer-implemented method of claim 11, wherein the threshold is determined based at least in part on the user-submitted task.

14. The computer-implemented method of claim 11, wherein the threshold is determined based at least in part on a performance guarantee.

15. The computer-implemented method of claim 6 further comprising causing the first worker manager to provision an additional sandbox.

16. The computer-implemented method of claim 6, wherein obtaining the plurality of worker managers comprises determining the plurality of worker managers based at least in part on the user-submitted task.

17. Non-transitory computer-readable media including computer-executable instructions that, when executed by a processor, cause the processor to perform operations including:

obtaining a request to execute a user-submitted task on an on-demand code execution system;

repeatedly transmitting a first sandbox reservation request to individual worker managers of a plurality of worker managers until either a response is received that fulfills the first sandbox reservation request or a threshold is satisfied, wherein the first sandbox reservation request specifies fulfilling the request with a previously provisioned sandbox on a computing device managed by the individual worker manager;

in response to a determination that the threshold has been satisfied, transmitting a second sandbox reservation request to a worker manager of the plurality of worker managers, wherein the second sandbox reservation request specifies fulfilling the request with either a previously provisioned sandbox or a newly provisioned sandbox, and wherein the worker manager is selected based at least in part on a first criterion;

receiving, from the worker manager, a response that enables access to a sandbox on a computing device managed by the worker manager; and causing the user-submitted task to be executed in the sandbox.

18. The non-transitory computer-readable media of claim 17 including further computer-executable instructions that, when executed by the processor, cause the processor to perform operations including selecting the individual worker managers of the plurality of worker managers based at least in part on the first criterion.

19. The non-transitory computer-readable media of claim 17 including further computer-executable instructions that, when executed by the processor, cause the processor to perform operations including determining the threshold based at least in part on an estimated resource cost of provisioning a sandbox that is operable to execute the user-submitted task.

20. The non-transitory computer-readable media of claim 17 including further computer-executable instructions that, when executed by the processor, cause the processor to perform operations including determining the threshold based at least in part on a success rate of previous requests to execute user-submitted tasks on previously provisioned sandboxes.

21. The non-transitory computer-readable media of claim 17 including further computer-executable instructions that, when executed by the processor, cause the processor to perform operations including selecting individual worker managers from the plurality of worker managers based at least in part on a success rate of the individual worker manager at fulfilling previous requests.

* * * * *